United States Patent
Žižka et al.

(10) Patent No.: US 9,485,214 B2
(45) Date of Patent: Nov. 1, 2016

(54) USE OF REVERSED DNS RECORDS FOR DISTRIBUTED MAPPING OF ASYMMETRIC CRYPTOGRAPHIC KEYS TO CUSTOM DATA

(75) Inventors: Ondřej Žižka, Brno (CZ); Peter Škopek, Myjava (SK)

(73) Assignee: Red Hat, Inc., Raleigh, NC (US)

( * ) Notice: Subject to any disclaimer, the term of this patent is extended or adjusted under 35 U.S.C. 154(b) by 1109 days.

(21) Appl. No.: 13/484,876

(22) Filed: May 31, 2012

(65) Prior Publication Data
US 2013/0326004 A1    Dec. 5, 2013

(51) Int. Cl.
*G06F 15/16* (2006.01)
*H04L 29/12* (2006.01)

(52) U.S. Cl.
CPC ......... *H04L 61/304* (2013.01); *H04L 61/1511* (2013.01)

(58) Field of Classification Search
CPC ............. H04L 9/00; H04L 29/12066; H04L 61/1511; H04L 67/306
USPC ................................ 709/245, 203, 225, 217
See application file for complete search history.

(56) References Cited

U.S. PATENT DOCUMENTS

| | | | |
|---|---|---|---|
| 8,650,245 B1* | 2/2014 | Ashley | 709/203 |
| 2002/0138649 A1* | 9/2002 | Cartmell et al. | 709/245 |
| 2003/0163567 A1* | 8/2003 | McMorris | H04L 29/06 709/225 |
| 2008/0034118 A1* | 2/2008 | Jinmei et al. | 709/245 |
| 2009/0164597 A1* | 6/2009 | Shuster | H04L 29/12066 709/206 |
| 2012/0079055 A1* | 3/2012 | Robinson | 709/213 |
| 2013/0036307 A1* | 2/2013 | Gagliano et al. | 713/171 |
| 2013/0290563 A1* | 10/2013 | Fleischman et al. | 709/245 |

* cited by examiner

*Primary Examiner* — Mohamed Ibrahim
(74) *Attorney, Agent, or Firm* — Lowenstein Sandler LLP (57) ABSTRACT

A server sends a lookup request for a first domain name to a Domain Name System (DNS) in response to receiving data associated with a user. The first domain name includes the data associated with the user. The server receives, an Internet Protocol (IP) address corresponding to the first domain name from the DNS. In response to receiving a request for data, the server determines an Internet Protocol (IP) address, wherein the request comprises an identifier, and wherein the IP address is determined based on the identifier. The server sends a reversed domain name lookup request for the IP address to the DNS. The server receives a domain name in response to the reversed domain name lookup request from the DNS. The data is determined based on the received domain name.

17 Claims, 5 Drawing Sheets

USE OF REVERSED DNS RECORDS FOR DISTRIBUTED MAPPING OF ASYMMETRIC CRYPTOGRAPHIC KEYS TO CUSTOM DATA

TECHNICAL FIELD

Embodiments of the present invention relate to data management, and more particularly, to a technique of using reversed DNS records for distributed mapping of asymmetric cryptographic keys to custom data.

BACKGROUND

There are many online services available to users, including banking, shopping, etc. When a user inputs a domain name for a service in a web browser, the user's computer can generate a request for the domain name and send the request to a Domain Name System (DNS), which provides an Internet Protocol (IP) address to the user's computer. The user's computer can then locate the service using the IP address and load the service into the user's web browser.

The DNS is a hierarchical distributed naming system for computers, services, or any resource connected to the Internet or a private network. The DNS associates information with domain names assigned to each of the participating entities. A Domain Name Service translates queries for domain names (host names), which are easier to understand and utilize when accessing the internet, into IP addresses for the purpose of locating computer services and devices worldwide. For example, the domain name www.example.com translates to the IP addresses 192.0.43.10 (IPv4) and 2620:0:2d0:200::10 (IPv6).

The DNS makes it possible to assign domain names to groups of Internet resources and users in a meaningful way, independent of each entity's physical location. Because of this, World Wide Web (WWW) hyperlinks and Internet contact information can remain consistent and constant even if the current Internet routing arrangements change or the participant uses a mobile device. Moreover, Internet domain names are easier to remember than IP addresses such as 208.77.188.166 (IPv4) or 2001:db8:1f70::999:de8:7648:6e8 (IPv6). Users take advantage of this when they recite meaningful Uniform Resource Locators (URLs) and e-mail addresses without having to know how the computer actually locates them.

The DNS distributes the responsibility of assigning domain names and mapping those names to IP addresses by designating authoritative name servers for each domain. Authoritative name servers are assigned to be responsible for their particular domains, and in turn can assign other authoritative name servers for their sub-domains. This mechanism has made the DNS distributed and fault tolerant and has helped avoid the need for a single central register to be continually consulted and updated.

The DNS can store or cache the mapping of domain names to IP addresses in DNS records. Moreover, the DNS can store or cache reversed DNS records, which map IP addresses to the domain names to which the IP addresses belong. The mapping between domain name and IP addresses may not necessarily be a one-to-one mapping, as one domain name can map to multiple IP addresses, and one IP address can map to multiple domain names. A reverse lookup is a query of the DNS for domain names when the IP address is known.

Currently, most IP addresses used in the DNS follow the Internet Protocol version 4 (IPv4), which uses IP addresses that are 32 bits (4 bytes) long. However, the growth of the Internet has created a need for more addresses than are possible with IPv4. Therefore, a new Internet Protocol, IPv6, uses 128-bit (16 bytes) addresses, for an address space of $2^{128}$ (approximately $3.4 \times 10^{38}$) addresses. By switching to IPv6, a much larger address space will be available for addresses. In IPv6, 64 bits may be used for the address of a domain name, and 64 bits can be an "interface ID," which can be used in any way.

Asymmetric cryptographic keys are used in cryptography for authentication and content verification. Asymmetric cryptographic keys can be binary data of a predefined length, such as 2 kilobytes. To make identification of the asymmetric cryptographic keys easier for humans, a subset of the binary data, known as a fingerprint, can be extracted using an algorithm predefined for the given key type. For example, 16 bytes may be extracted as a fingerprint of a 2 kilobyte number. By using an algorithm that is predefined for the given asymmetric cryptographic key, the fingerprint generated for an asymmetric cryptographic key may always be the same. The subset of the binary data of an asymmetric cryptographic key can practically be unique.

When using an online service, a user may need to enter in information related to the user. Examples of information that the service may need to know can include the user's bank account(s), the currency that the user accepts, the languages that the user speaks, the user's email address(es), user's shoe size, etc.

The information provided by the user can generally be stored in a database for the service. However, storing the information in this manner can be inefficient, as each service used by a user stores the data, resulting in the duplication of data if multiple services need the same information. Moreover, the user may have to re-enter the information for each service used by the user.

There have been many approaches to creating an online system which can reliably map information entered by a user to a unique and secure identification for the user, such that the user does not have to re-enter the information for each service and to save storage space for the services. These approaches include single-sign-on account extensions, information formats (e.g., V-card), .name top-level domain (TLD), and RFID-based solutions. However, none of the current approaches are widely accepted or adopted. Moreover, these approaches may require additions to existing technologies, may be impractical to implement, may be expensive, or may require a physical device.

BRIEF DESCRIPTION OF THE DRAWINGS

Various embodiments of the present invention will be understood more fully from the detailed description given below and from the accompanying drawings of various embodiments of the invention.

DETAILED DESCRIPTION

Embodiments of the invention are directed to a method and system for using reversed DNS records for distributed mapping of asymmetric cryptographic keys to custom data.

A user using an online service may provide custom data to the service by providing the data to a web browser running on a computing system. For example, the user can provide bank account information, currency information, user's email addresses, user's shoe size, etc. to a website for a service related to the provided information. Using reversed DNS records and asymmetric cryptographic keys in a Domain Name System (DNS), the custom data can be mapped to the user, such that the user does not need to provide the same data in the future.

The user can provide the custom data to the service, as well as can provide an identifier, such as an asymmetric cryptographic key. For example, the user can go to a service provided by myshoesize.com, enter in an identifier "XYZ" for the user and a shoe size of "size7". Upon receiving this information, the service generates a domain name including the custom data, the user's identifier, and the domain name for the service. For example, the generated domain name that is generated is "size7-XYZ.myshoesize.com." The service can request a DNS lookup from the DNS to determine an IP address for the generated domain name. The DNS lookup can return an IP address including the IP address corresponding to the domain name of the service. For example, the DNS lookup can return the IP address containing "FA1C9288 029BCE62," where FA1C9288 corresponds to the IP address for the service myshoesize.com and 029BCE62 corresponds to the user's identifier.

Upon a subsequent request by the user, the user may provide the user's identifier to the service. Upon receiving the identifier, the service can determine a lookup IP address based on an IP address associated with the service and the identifier. For example, the service for myshoesize.com could be configured to assemble the IP address for myshoesize.com and the user's fingerprint 029BCE62 to generate a lookup IP address of "FA1C9288 029BCE62." The IP address associated with the service can be a website IP address, data storage IP address, or any other IP address that can be obtained by a client of the service. The service can send a reversed domain name lookup for the IP address to the DNS and receive a domain name back from the DNS. For example, the received domain name returns a domain name of "size7-029BCE62.myshoesize.com" for a reversed domain name lookup for the IP address of FA1C9288 029BCE62. The service can parse the received domain name to obtain the user's shoe size of "size7," such that the user does not have to re-enter this custom data.

Figure 1:
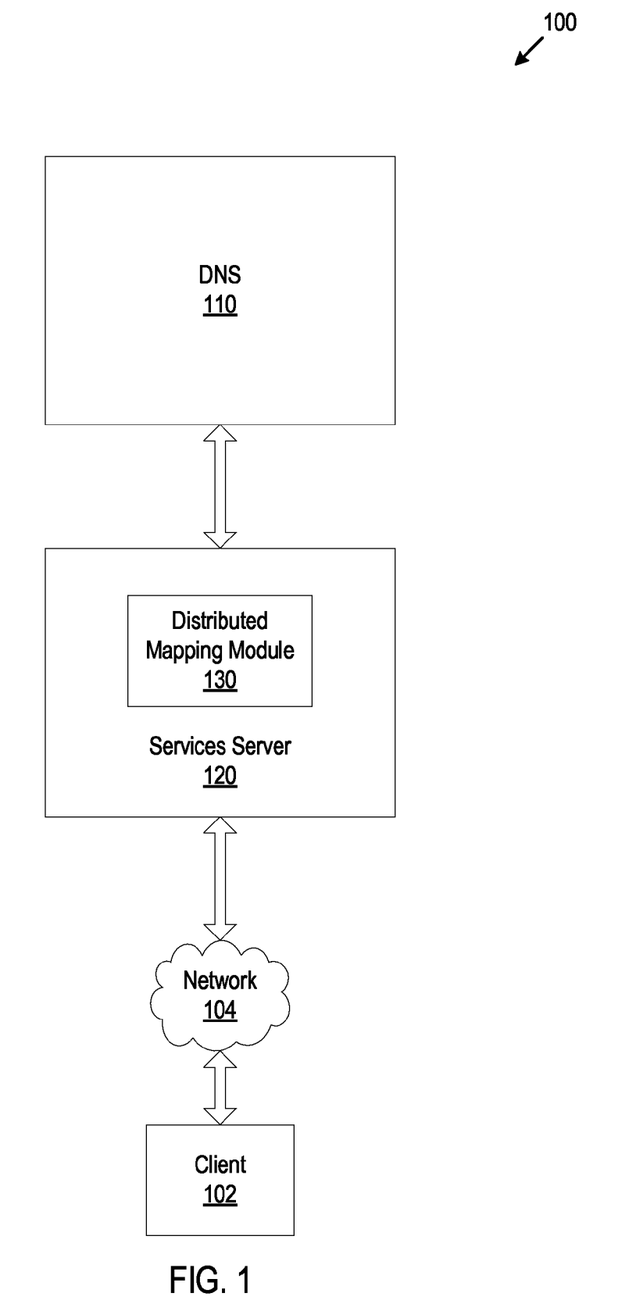
FIG. 1 illustrates exemplary system architecture, in accordance with various embodiments of the present invention.

FIG. 1 illustrates exemplary system architecture 100 in which embodiments can be implemented. The system architecture 100 includes a Domain Name System (DNS) 110, a services server 120, and a client machine 102 connected to a network 104. Network 104 may be may be a private network (e.g., a local area network (LAN), a wide area network (WAN), intranet, etc.), a corporate network (e.g., a private network for an organization such as a corporation), a broadcast network, a public network (e.g., the Internet), a wired network (e.g., Ethernet network), a wireless network (e.g., an 802.11 network) and/or a cellular network (e.g., a Long Term Evolution (LTE) network).

DNS 110 is a hierarchical distributed database system that uses a client-server model. The nodes of the distributed database system are name servers. Each domain has at least one authoritative DNS server (not shown) that publishes information about that domain and the name servers of any domains subordinate to it.

Services server 120 may be a rackmount server, a router computer, a personal computer, a portable digital assistant, a mobile phone, a laptop computer, a tablet computer, a camera, a video camera, a netbook, a desktop computer, a media center, or any combination of the above. In one embodiment, the services server 120 is deployed as a network appliance (e.g., a network router, hub, or managed switch).

The client machine 102 may be a personal computer (PC), laptop, mobile phone, tablet computer, or any other computing device. The client machines 102 may run an operating system (OS) that manages hardware and software of the client machines 102. A client program (not shown), such as a browser, may run on the client machines (e.g., on the OS of the client machines) or may be accessible to the client machines. The client program may be software, such as a web browser, or hardware that can receive custom data and/or an identifier (e.g., secure key) from a user.

During operation of system 100, a user can submit custom data and/or an identifier for the user to a client program (not shown). In one embodiment, the client program is software that is running on client 102. In an alternate embodiment, the client program is hardware (e.g., video camera) that is associated with the client 102. The services server 120 receives the custom data and/or identifier from the client device 102 over network 104, and processes and/or directs these communications accordingly. In one embodiment, the services system 120 can include a distributed mapping module 130.

In response to receiving the custom data and the identifier, the distributed mapping module 130 can generate a domain name including the custom data and the identifier. The custom data can be data that a user would like to save, such that the user does not need to re-enter the data in the future. The identifier is an identifier of the user, such as a secure key (e.g., asymmetric cryptographic key), a fingerprint of a secure key or other identifier, an alphanumeric identifier for the user, etc. The generated domain name can include a website domain name for a website associated with the user. The generated domain name can be in a format that is supported by DNS 110.

The distributed mapping module 130 can send a lookup request for the generated domain name to the DNS 110. DNS 110 can obtain a mapping for the generated domain name to an IP address, and send the IP address to the distributed mapping module 130. The distributed mapping module 130 receives the IP address for the generated domain name from the DNS 110. In some embodiments, the distributed mapping module 130 stores the received IP address in a memory (not shown) of services server 120.

In response to receiving an identifier subsequent to storing the custom data, the distributed mapping module 130 can determine an IP address using the identifier by combining the identifier and an IP address of a server, such as services server 120. In one embodiment, the IP address is for a website requested by the user. In an alternate embodiment, the IP address is for a website associated with a service requested by the user. The identifier is an identifier of the user, such as a secure key (e.g., asymmetric cryptographic key), a fingerprint, an alphanumeric identifier for the user, etc.

The distributed mapping module 130 can send a reversed domain name lookup request including the determined IP address to DNS 110, and can receive a domain name from the DNS 110. The distributed mapping module 130 can determine custom data based on the received domain name by parsing the received domain name and determining a predefined portion of the received domain name as the custom data.

Figure 2:
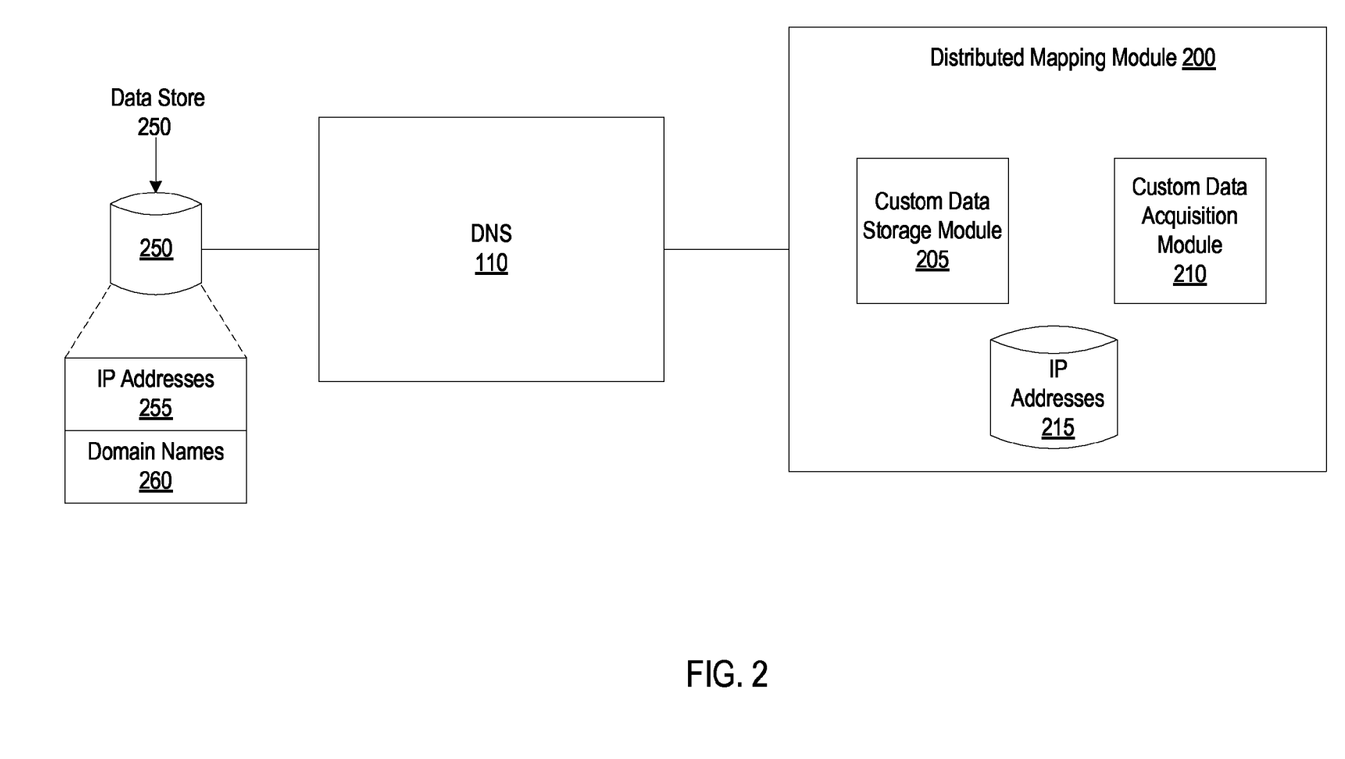
FIG. 2 is a block diagram of a distributed mapping module, in accordance with an embodiment.

FIG. 2 is a block diagram of a DNS 110 and a distributed mapping module 200, in accordance with one embodiment of the present invention.

The DNS 110 can store or cache one or more mappings between an IP address and a domain name. In response to a lookup request that includes domain name, the DNS 110 can determine if the domain name is included in domain names 260, and can obtain an IP address from IP addresses 255 that is mapped to the domain name. If a domain name is not mapped to an IP address, the DNS 110 can determine an IP address for the domain name and store the IP address in IP addresses 255. In response to a reversed domain name lookup request that includes an IP address, the DNS 110 can determine if the IP address is included in IP addresses 255, and can obtain one or more domain names from domain names 260 that are associated with the IP address.

The distributed mapping module 200 includes a custom data storage module 205, a custom data acquisition module 210, and IP addresses 215. Note that in alternative embodiments, the functionality of one or more of the custom data storage module 205, the custom data acquisition module 210, and the IP addresses 215 may be combined or divided.

The custom data storage module 205 can receive custom data and an identifier. The custom data can be data that a user would like to save, such that the user does not need to re-enter the data in the future. The identifier is an identifier of the user, such as a secure key (e.g., asymmetric cryptographic key), a fingerprint, an alphanumeric identifier for the user, etc.

In response to receiving the custom data and the identifier, the custom data storage module 205 can generate a domain name including the custom data and the identifier. The generated domain name can include a service domain name. In one embodiment, the custom data storage module 205 generates the domain name by concatenating the service domain name, the custom data, and the identifier. In an alternate embodiment, processing logic generates the domain name by copying the service domain name into a first predefined portion of the generated domain name (e.g., first segment of the domain name, top-level domain (TLD) name, subdomain name ($3^{rd}$ rightmost segment), etc.), copying the identifier into a second predefined portion of the generated domain name (e.g., the part of the domain name after the first predefined portion, the middle segment of the domain name, the part of the domain name to the left of the custom data, etc.), and copying the custom data into a third predefined portion of the generated domain name (e.g., the last part of the domain name, the leftmost part of the domain name, the subdomain name, etc.).

The custom data storage module 205 can send a lookup request for the generated domain name to the DNS 110, and receive an IP address for the generated domain name from the DNS 110. In some embodiments, the custom data storage module 205 can store the received IP address in IP addresses 215.

The custom data acquisition module 210 receives an identifier. The identifier is an identifier of the user, such as a secure key (e.g., asymmetric cryptographic key), a fingerprint, an alphanumeric identifier for the user, etc. The custom data acquisition module 210 can determine an IP address using the identifier by combining the identifier and an IP address for a server associated with a service. In one embodiment, the IP address is obtained from IP addresses 215. In one embodiment, the IP address is for a server associated with the service requested by the user. In an alternate embodiment the IP address is for a server of a website associated with a service requested by the user.

The custom data acquisition module 210 can send a reversed domain name lookup request including the determined IP address to DNS 110, and can receive a domain name from the DNS 110. The custom data acquisition module 210 can determine custom data based on the received domain name by parsing the received domain name and determining a predefined portion of the received domain name as the custom data.

Figure 3:
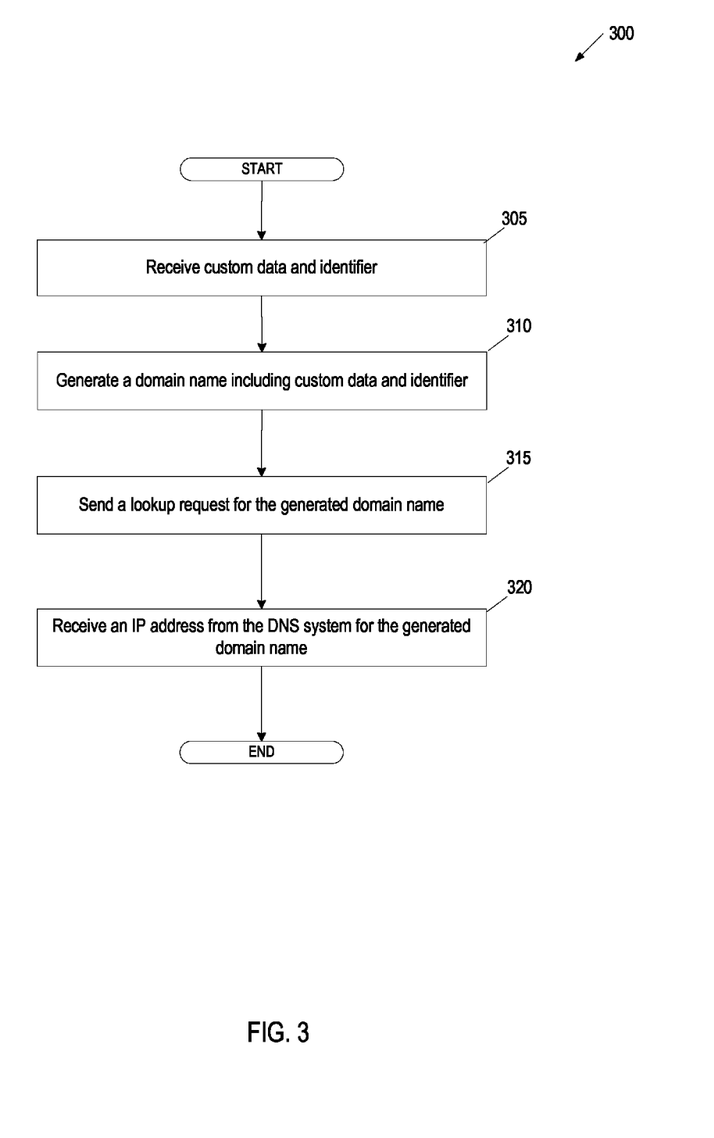
FIG. 3 is a flow diagram illustrating an embodiment for a method of storing custom data using reversed DNS records for distributed mapping of asymmetric cryptographic keys to the custom data, in accordance with an embodiment.

FIG. 3 is a flow diagram of an embodiment of a method 300 for storing custom data using reversed DNS records for distributed mapping of asymmetric cryptographic keys to the custom data. The method 300 is performed by processing logic that may comprise hardware (circuitry, dedicated logic, etc.), software (such as is run on a general purpose computer system or a dedicated machine), or a combination of both. In one embodiment, the method 300 is performed by the distributed mapping module 200 of FIG. 2.

At block 305, processing logic receives custom data and an identifier. In one embodiment, the custom data is data that a user would like to associate with an online service, such that the user does not need to re-enter the information the next time the user uses the online service. In one embodiment, the online service is integrated with, or running on, a website or an application loaded by the user. In an alternate embodiment, the online service is separate from the website and must be run prior to the user requesting the website or application. For example, a user visiting a website for myshoesize.com wants the online service to remember the user's shoe size once the user enters in the shoe size.

In one embodiment, the identifier is an asymmetric cryptographic key. In an alternate embodiment, the identifier is a fingerprint. In another alternate embodiment, the identifier is an alphanumeric identifier for the user, such as an email address, user name, etc. In one embodiment, the identifier is inputted into a user interface. In an alternate embodiment, the identifier can be transmitted from a user's device (e.g., cell phone) to the service via Bluetooth, a direct Wi-Fi connection, email, etc.

The custom data can be specified by the user via a user interface provided by the service. The user interface can be a text input box or form on a website for the service, an application for the service on a smartphone, can be provided by another service, etc. For example, a user at a shoe store provides the user's shoe size and an identifier for the user (e.g., credit card number, email address, etc.) to an employee of the shoe store, and the employee enters the shoe size and identifier into a system for the service. In another example, a user visiting the website for the myshoesize service, such as www.myshoesize.com, logs into the website to access the user's account, and provides the user's shoe size into a text box. Within the account information, the user can enter in the shoe size of the user. The service can store the custom data and the identifier in a memory associated with the service.

At block 310, processing logic generates a domain name including the custom data and the identifier. In one embodiment, processing logic generates the domain name by concatenating a website domain name, the custom data, and the identifier. In an alternate embodiment, processing logic generates the domain name by copying the website domain name into a first predefined portion of the generated domain name (e.g., first segment of the domain name, top-level domain (TLD) name, subdomain name ($3^{rd}$ rightmost segment), etc.), copying the identifier into a second predefined portion of the generated domain name (e.g., the part of the domain name after the first predefined portion, the middle segment of the domain name, the part of the domain name to the left of the custom data, etc.), and copying the custom data into a third predefined portion of the generated domain name (e.g., the last part of the domain name, the leftmost part of the domain name, the subdomain name, etc.). For example, for an online website or service with a domain name of language.com, if a user's identifier is 123ABC45 and the custom data is English, the generated domain name is English-123ABC45.language.com. The service's domain name can be used as a base for the generated domain name. For example, the top-level domain of the service can be used as top-level domain part of the generated domain name.

Prior to generating the domain name, processing logic can check that the custom data and the identifier follow predefined rules. The predefined rules can include rules for the characters that can be used in a domain name, in an identifier, in custom data, and any other received input. The predefined rules can further include rules for the length of the custom data and the identifier (e.g., no longer than 8 bytes total). For example, only letters a through z, numbers, and hyphen characters can be used. In one embodiment, if the custom data or the identifier does not follow the predefined rules, processing logic can return an error to the user to re-enter the data that did not follow the predefined rules. In an alternate embodiment, if the custom data or the identifier does not follow the predefined rules, processing logic can modify the data that did not follow the rules such that the modified data conforms to the rules.

At block 315, processing logic sends a lookup request for the generated domain name to a DNS.

At block 320, processing logic receives an IP address for the generated domain name from the DNS. The DNS can send the IP address for the generated domain name in response to receiving the lookup request for the generated domain name. Performing a lookup request for a domain name by a DNS is commonly known in the art. By performing a lookup request for the generated domain name, the DNS generates and stores a mapping of the domain name to the IP address. In one embodiment, the IP address received from the DNS is an IPv6 address that is 16 bytes in length, and includes the identifier. For example, for the generated domain name of English-123ABC45.language.com, the DNS sends an IP address of FA1C9288 123ABC45.

In some embodiments, the method 300 can be repeated for additional custom data for the user. In these embodiments, the method 300 can generate a domain name including the additional custom data and the identifier as above, thereby allowing a user to store more than one piece of custom data with the identifier of the user. For example, the user can store an additional language spoken by the user, such as Spanish. In this example, the generated domain name is Spanish-123ABC45.language.com, which will also be stored with the IP address of FA1C9288 123ABC45.

Figure 4:
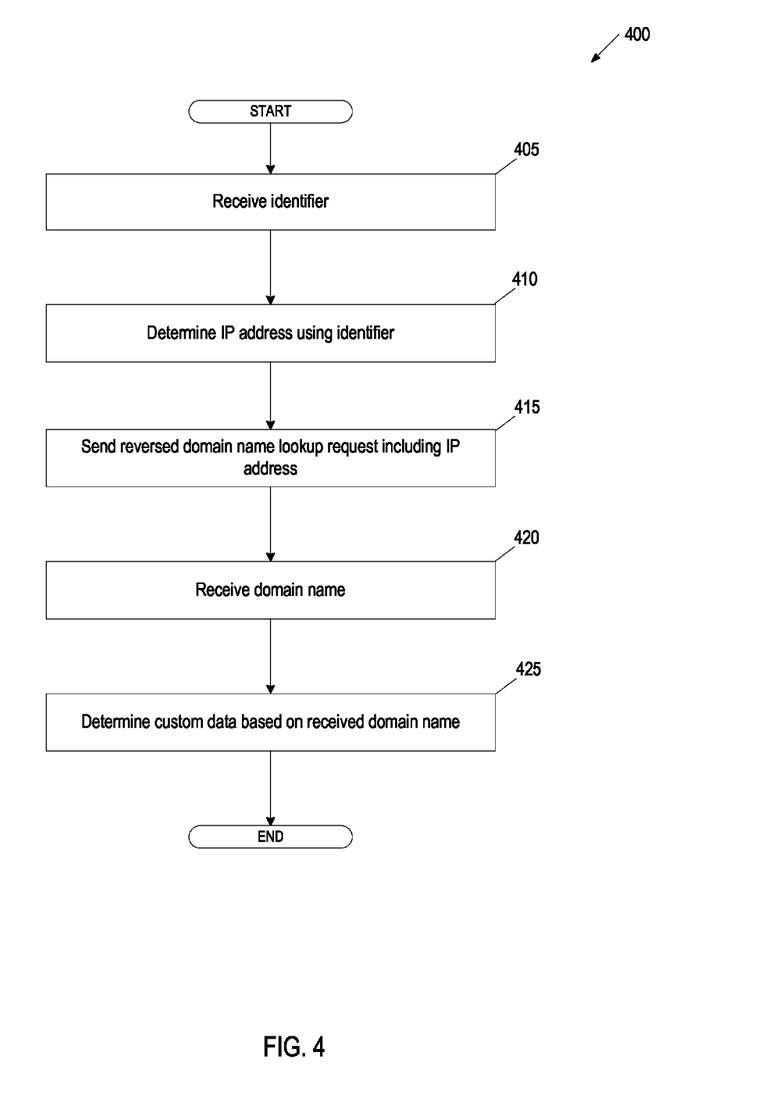
FIG. 4 is a flow diagram illustrating an embodiment for a method of acquiring custom data using reversed DNS records for distributed mapping of asymmetric cryptographic keys to the custom data, in accordance with an embodiment.

FIG. 4 is a flow diagram of an embodiment of a method 400 for acquiring custom data using reversed DNS records for distributed mapping of asymmetric cryptographic keys to the custom data. The method 400 is performed by processing logic that may comprise hardware (circuitry, dedicated logic, etc.), software (such as is run on a general purpose computer system or a dedicated machine), or a combination of both. In one embodiment, the method 400 is performed by the distributed mapping module 200 of FIG. 2.

At block 405, processing logic receives an identifier. In one embodiment, the identifier is a secure key (e.g., asymmetric cryptographic key). In an alternate embodiment, the identifier is a fingerprint. In another alternate embodiment, the identifier is an alphanumeric identifier for the user, such as an email address, user name, etc. In one embodiment, the identifier is inputted into a user interface. In an alternate embodiment, the identifier can be transmitted from a user's device (e.g., cell phone) to the service via Bluetooth, a direct Wi-Fi connection, or via email. The identifier can be transmitted by the user or another person moving a badge with an RFID chip to a scanning device, scanning a quick response code, etc. The identifier could be read by a car from the key of the car, etc.

At block 410, processing logic determines an IP address using the identifier. In one embodiment, the IP address is determined by assembling the IP address from the identifier and an IP address associated with the service. In an alternate embodiment, processing logic generates the domain name by copying the IP address associated with the website into a first predefined portion of the determined IP address (e.g., upper 8 bytes, etc.) and copying the identifier into a second predefined portion of the determined IP address (e.g., the lower 8 bytes, etc.). In one embodiment, the IP address of the website is cached in a memory associated with the online service to which the custom data and the identifier were previously provided. For example, for a website language.com that associated with an online service, the online service can determine that the IP address of language.com is FA1C9288. If a user's identifier is 123ABC45, the IP address is determined to be FA1C9288 123ABC45. For IPv6, the IP address of the website can be copied or stored into the upper 8 bytes of the determined IP address and the identifier can be stored into the lower 8 bytes of the determined IP address.

At block 415, processing logic can send a reversed domain name lookup request including the determined IP address to a DNS.

At block 420, processing logic can receive a domain name from the DNS. The DNS can send the domain name for the determined IP address in response to receiving the reversed domain name lookup request for the determined IP address. Performing a reversed domain name lookup for a reversed domain name lookup request for an IP address by a DNS is commonly known in the art. By performing a reversed domain name lookup request for the determined IP address, the DNS looks up a mapping of the IP address and a domain name to which the IP address maps. For example, for a determined IP address of FA1C9288 123ABC45, the DNS returns English-123ABC45.language.com. In one embodiment, processing logic receives more than one domain name from the DNS in response to the IP address if the user has stored more than one piece of data with the service. For example, if a user has stored English and Spanish as languages spoken by the user, processing logic receives English-123ABC45.language.com and Spanish-123ABC45.language.com.

At block 425, processing logic can determine custom data based on the received domain name. Processing logic determines the custom data by parsing the received domain name and determining a predefined portion of the received domain name as the custom data. In one embodiment, the predefined portion of the received domain name is the upper 2 bytes of the received domain name. In alternate embodiments, the predefined portion of the received domain name can be a different portion of the received domain name without departing from the scope of the invention. For example, if a domain name of English-123ABC45.language.com, processing logic could parse the portion in the domain name to the left of the top-level domain to obtain "English" as the custom data stored for the identifier of 123ABC45. In another example, if a domain name of English-123ABC45.language.redhat.com, processing logic could parse the portion in the domain name to the left of the domain name associated with the service to obtain "English" as the custom data stored for the identifier of 123ABC45. If one or more additional domain names are received in response to the IP address, the additional domain names are parsed for the custom data provided by those additional domain names.

Figure 5:
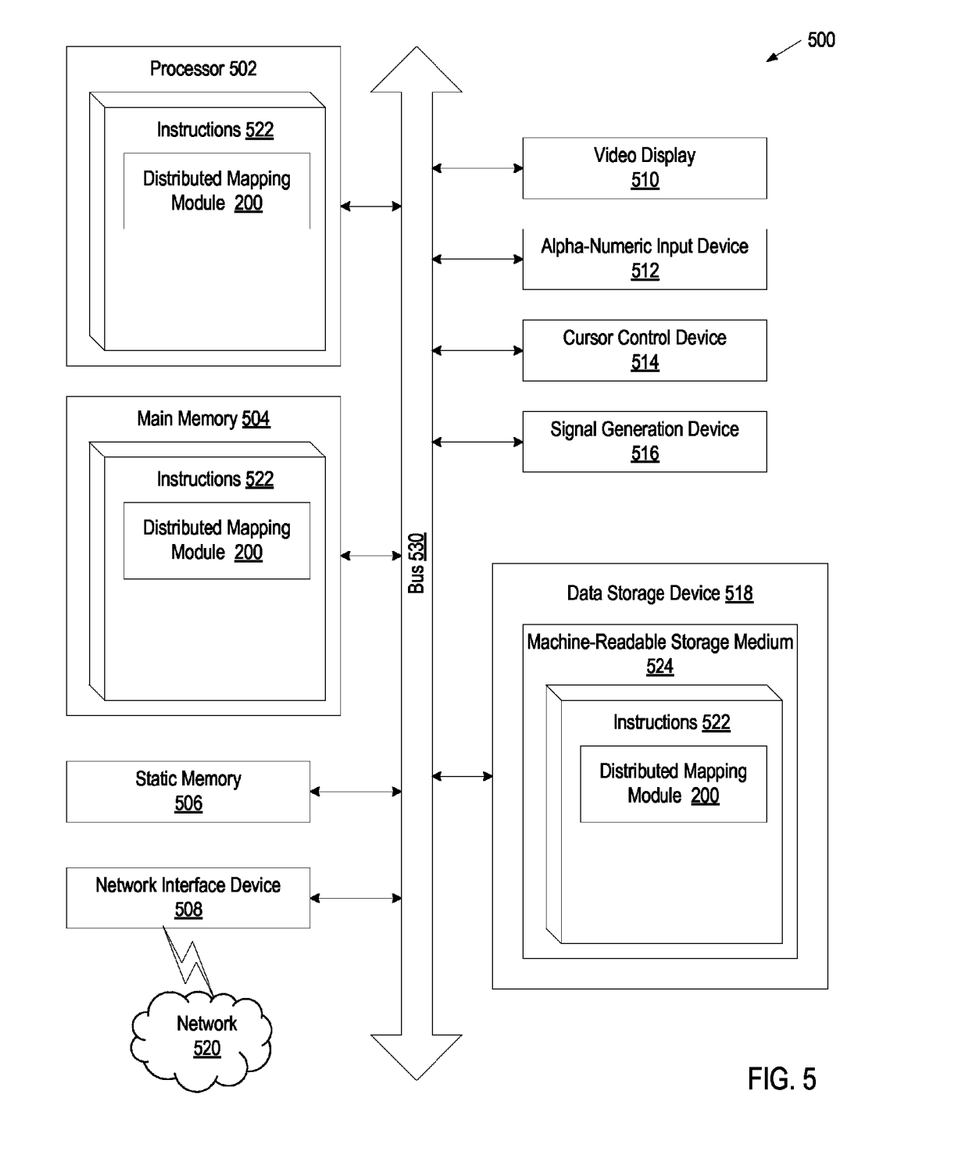
FIG. 5 is a block diagram of an exemplary computer system that may perform one or more of the operations described herein.

FIG. 5 illustrates a diagram of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable storage medium 524 on which is stored one or more sets of instructions 522 (e.g., software) embodying any one or more of the methodologies or functions described herein. The instructions 522 may also reside, completely or at least partially, within the main memory 504 and/or within the processor 502 during execution thereof by the computer system 500, the main memory 504 and the processor 502 also constituting computer-readable storage media. The instructions 522 may further be transmitted or received over a network 520 via the network interface device 508.

In one embodiment, the instructions 522 include instructions for a distributed mapping module (e.g., distributed mapping module 200 of FIG. 2) and/or a software library containing methods that call a distributed mapping module. While the computer-readable storage medium 524 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "presenting", "updating", "determining", "executing," "providing," "receiving," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by a processing device of a user device, data associated with a user account;
   generating, by the processing device, a first domain name, the first domain name comprising a first part, a second part, and a third part, wherein the first part comprises the data, the second part comprises an identifier of the user account, and the third part comprises a second domain name for which a Domain Name System (DNS) service is to be requested;
   transmitting, to a DNS, a first request to look up an Internet Protocol (IP) address for the first domain name;
   receiving, from the DNS, a first IP address comprising a first portion corresponding to the second domain name and a second portion corresponding to the identifier of the user account;
   transmitting, to DNS, a reversed domain name lookup request comprising a second IP address, wherein the second IP address comprises the first portion and the second portion;
   receiving, from the DNS, the first domain name;
   determining the data associated with the user account in view of the first domain name; and
   populating, by the processing device, the data associated with the user account in a document presented on a user interface associated with the user device.

2. The method of claim 1, wherein the data associated with the user account comprises custom data for the user account.

3. The method of claim 1, further comprising:
   storing the first IP address corresponding to the first domain name, wherein the first IP address is in view of a predefined IP.

4. The method of claim 1, wherein the user device is a cell phone that is connected to the DNS via a wireless connection.

5. The method of claim 1, wherein the identifier comprises an asymmetric cryptographic key to the data associated with the user account.

6. The method of claim 1, wherein determining the data associated with the user account in view of the received first domain name comprises:
   parsing the received first domain name for the data associated with the user account.

7. A non-transitory computer readable storage medium to store instructions that, when executed by a processing device of a user device, cause the processing device to:
   receive, by the processing device, data associated with a user account;
   generate, by the processing device, a first domain name, the first domain name comprising a first part, a second part, and a third part, wherein the first part comprises the data, the second part comprises an identifier of the user account, and the third part comprises a second domain name for which a Domain Name System (DNS) service is to be requested;
   transmit, to a DNS, a first request to look up an Internet Protocol (IP) address for the first domain name;
   receive, from the DNS, a first IP address comprising a first portion corresponding to the second domain name and a second portion corresponding to the identifier of the user account;
   transmit, to DNS, a reversed domain name lookup request comprising a second IP address, wherein the second IP address comprises the first portion and the second portion;
   receive, from the DNS, the first domain name;
   determine the data associated with the user account in view of the first domain name; and
   populate, by the processing device, the data associated with the user account in a document presented on a user interface associated with the user device.

8. The non-transitory computer readable storage medium of claim 7, wherein the data associated with the user account comprises custom data for the user account.

9. The non-transitory computer readable storage medium of claim 7, wherein the processing device is further to:
   store the first IP address corresponding to the first domain name, wherein the first IP address is in view of a predefined IP.

10. The non-transitory computer readable storage medium of claim 7, wherein the user device is a cell phone that is connected to the DNS via a wireless connection.

11. The non-transitory computer readable storage medium of claim 7, wherein the identifier comprises an asymmetric cryptographic key to the data associated with the user account.

12. The non-transitory computer readable storage medium of claim 7, wherein to determine data in view of the received first domain name, the processing device is to:
   parse the received first domain name for the data associated with the user account.

13. A computing device comprising:
   a memory; and
   a processing device, communicatively coupled to the memory, wherein the processing device is to:
   receive data associated with a user account;
   generate a first domain name, the first domain name comprising a first part, a second part, and a third part, wherein the first part comprises the data, the second part comprises an identifier of the user account, and the third part comprises a second domain name for which a Domain Name System (DNS) service is to be requested;
   transmit a first request to look up an Internet Protocol (IP) address for the first domain name;
   receive, from the DNS, a first IP address comprising a first portion corresponding to the second domain name and a second portion corresponding to the identifier of the user account;

transmit, to DNS, a reversed domain name lookup request comprising a second IP address, wherein the second IP address comprises the first portion and the second portion;

receive, from the DNS, the first domain name;

determine the data associated with the user account in view of the first domain name; and populate, by the processing device, the data associated with the user account in a document presented on a user interface associated with the user device.

14. The computing device of claim 13, wherein the data associated with the user account comprises custom data for the user account.

15. The computing device of claim 13, wherein the processing device is further to:

store the first IP address corresponding to the first domain name, wherein the first IP address is in view of a predefined IP.

16. The computing device of claim 13, wherein the user device is a cell phone that is connected to the DNS via a wireless connection.

17. The computing device of claim 13, wherein the identifier comprises an asymmetric cryptographic key to the data associated with the user account.

* * * * *